(12) United States Patent
McGill, Jr. et al.

(10) Patent No.: US 11,442,451 B2
(45) Date of Patent: Sep. 13, 2022

(54) SYSTEMS AND METHODS FOR GENERATING DRIVING RECOMMENDATIONS

(71) Applicant: Toyota Research Institute, Inc., Los Altos, CA (US)

(72) Inventors: Stephen G. McGill, Jr., Broomall, PA (US); Guy Rosman, Newton, MA (US); Luke S. Fletcher, Cambridge, MA (US); Brent Schlotfeldt, Philadelphia, PA (US)

(73) Assignee: Toyota Research Institute, Inc., Los Altos, CA (US)

(*) Notice: Subject to any disclaimer, the term of this patent is extended or adjusted under 35 U.S.C. 154(b) by 346 days.

(21) Appl. No.: 16/833,774

(22) Filed: Mar. 30, 2020

(65) Prior Publication Data

US 2021/0302960 A1    Sep. 30, 2021

(51) Int. Cl.
| | | |
|---|---|---|
| *G05D 1/00* | (2006.01) | |
| *G06N 3/04* | (2006.01) | |
| *G06N 3/08* | (2006.01) | |
| *G08G 1/01* | (2006.01) | |
| *G05D 1/02* | (2020.01) | |

(52) U.S. Cl.
CPC ......... *G05D 1/0088* (2013.01); *G05D 1/0214* (2013.01); *G06N 3/0427* (2013.01); *G06N 3/0454* (2013.01); *G06N 3/088* (2013.01); *G08G 1/0108* (2013.01); *G08G 1/0129* (2013.01); *G08G 1/0145* (2013.01); *G05D 2201/0213* (2013.01)

(58) Field of Classification Search
CPC ............... G05D 1/0088; G05D 1/0214; G05D 2201/0213; G06N 3/0427; G06N 3/0454; G06N 3/088; G08G 1/0108; G08G 1/0129; G08G 1/0145

See application file for complete search history.

(56) References Cited

FOREIGN PATENT DOCUMENTS

WO    2019081781 A1    5/2019

OTHER PUBLICATIONS

Wei et al., "Predicting Fine-Grained Traffic Conditions via Spatio-Temporal LSTM," Wireless Communications and Mobile Computing, vol. 2019, Wiley/Hindawi, found at http://downloads.hindawi.com/journals/wcmc/2019/9242598.pdf.

(Continued)

*Primary Examiner* — Mathew Franklin Gordon
(74) *Attorney, Agent, or Firm* — Christopher G. Darrow; Darrow Mustafa PC (57) ABSTRACT

Systems and methods for generating driving recommendations are disclosed herein. One embodiment divides automatically a roadway into a plurality of lane-level cells; generates a graph network that represents the plurality of lane-level cells; gathers information pertaining to one or more detected road agents; projects onto the graph network the gathered information pertaining to the one or more detected road agents to update a current status of the plurality of lane-level cells; processes the graph network based on the updated current status of the plurality of lane-level cells to predict a future status of the plurality of lane-level cells, the predicted future status including at least occupancy, by a detected road agent, of the respective lane-level cells in the plurality of lane-level cells; and generates a driving recommendation based, at least in part, on the predicted future status of the plurality of lane-level cells.

20 Claims, 5 Drawing Sheets

(56) References Cited

OTHER PUBLICATIONS

Muñoz et al., "Traffic Density Estimation with the Cell Transmission Model," 2003, IEEE, found at https://www.researchgate.net/profile/Roberto_Horowitz/publication/4038651_Traffic_Density_Estimation_with_the_Cell_Transmission_Model/links/0deec51ead7174c608000000.pdf.

Cui et al., "Traffic Graph Convolutional Recurrent Neural Network: A Deep Learning Framework for Network-Scale Traffic Learning and Forecasting," 2018.

Cui et al., "Deep Stacked Bidirectional and Unidirectional LSTM Recurrent Neural Network for Network-Wide Traffic Speed Prediction," 2016, found at https://arxiv.org/ftp/arxiv/papers/1801/1801.02143.pdf.

Diehl et al., "Graph Neural Networks for Modelling Traffic Participant Interaction," 2019 IEEE Intelligent Vehicles Symposium (IV), Paris, France, Jun. 9-12, 2019, found at https://arxiv.org/pdf/1903.01254.pdf.

Li et al., "Diffusion Convolutional Recurrent Neural Network: Data-Driven Traffic Forecasting," ICLR 2018, found at https://arxiv.org/pdf/1707.01926.pdf.

Lu et al., "Graph Hierarchical Convolutional Recurrent Neural Network (GHCRNN) for Vehicle Condition Prediction," Mar. 12, 2019, found at https://arxiv.org/ftp/arxiv/papers/1903/1903.06261.pdf.

Ma et al., "TrafficPredict: Trajectory Prediction for Heterogeneous Traffic-Agents," The Thirty-Third AAAI Conference on Artificial Intelligence (AAAI-19), 2019, found at https://aaai.org/ojs/index.php/AAAI/article/view/4569/4447.

Mohanty et al., "Graph CNN + LSTM Framework for Dynamic Macroscopic Traffic Congestion Prediction", found at https://www.mlgworkshop.org/2018/papers/MLG2018_paper_41.pdf.

Xie et al., "Sequential Graph Neural Network for Urban Road Traffic Speed Prediction," IEEE, 2016, found at https://ieeexplore.ieee.org/stamp/stamp.jsp?arnumber=8708297.

Yu et al., "Spatio-Temporal Graph Convolutional Networks: A Deep Learning Framework for Traffic Forecasting," Jul. 12, 2018, found at https://arxiv.org/pdf/1709.04875.pdf.

Zhao et al., "T-GCN: A Temporal Graph Convolutional Network for Traffic Prediction," Dec. 31, 2018, found at https://arxiv.org/pdf/1811.05320.pdf.

SYSTEMS AND METHODS FOR GENERATING DRIVING RECOMMENDATIONS

TECHNICAL FIELD

The subject matter described herein generally relates to vehicles and, more particularly, to systems and methods for generating driving recommendations.

BACKGROUND

In a variety of applications, including, for example, adaptive cruise control (ACC) systems, advanced driver-assistance systems (ADAS), parallel-autonomy vehicles, semi-autonomous vehicles, and autonomous vehicles, the need arises to predict the future behavior of road agents (vehicles, motorcycles, bicycles, scooters, pedestrians, etc.) in the environment of a vehicle to control the vehicle in a manner that avoids a traffic incident (e.g., a collision or a high-deceleration event).

SUMMARY

An example of a system for generating driving recommendations is presented herein. The system comprises one or more processors and a memory communicably coupled to the one or more processors. The memory stores a graph-construction module including instructions that when executed by the one or more processors cause the one or more processors to divide automatically a roadway into a plurality of lane-level cells. The graph-construction module also includes instructions that when executed by the one or more processors cause the one or more processors to generate a graph network that represents the plurality of lane-level cells. The memory also stores a graph-update module including instructions that when executed by the one or more processors cause the one or more processors to gather information pertaining to one or more detected road agents. The graph-update module also includes instructions that when executed by the one or more processors cause the one or more processors to project onto the graph network the gathered information pertaining to the one or more detected road agents to update a current status of the plurality of lane-level cells. The memory also stores a prediction module including instructions that when executed by the one or more processors cause the one or more processors to process the graph network based on the updated current status of the plurality of lane-level cells to predict a future status of the plurality of lane-level cells, the predicted future status including at least occupancy, by a detected road agent, of the respective lane-level cells in the plurality of lane-level cells. The memory also stores a recommendation module including instructions that when executed by the one or more processors cause the one or more processors to generate a driving recommendation based, at least in part, on the predicted future status of the plurality of lane-level cells.

Another embodiment is a non-transitory computer-readable medium for generating driving recommendations and storing instructions that when executed by one or more processors cause the one or more processors to divide automatically a roadway into a plurality of lane-level cells. The instructions also cause the one or more processors to generate a graph network that represents the plurality of lane-level cells. The instructions also cause the one or more processors to gather information pertaining to one or more detected road agents. The instructions also cause the one or more processors to project onto the graph network the gathered information pertaining to the one or more detected road agents to update a current status of the plurality of lane-level cells. The instructions also cause the one or more processors to process the graph network based on the updated current status of the plurality of lane-level cells to predict a future status of the plurality of lane-level cells, the predicted future status including at least occupancy, by a detected road agent, of the respective lane-level cells in the plurality of lane-level cells. The instructions also cause the one or more processors to generate a driving recommendation based, at least in part, on the predicted future status of the plurality of lane-level cells.

In another embodiment, a method of generating driving recommendations is disclosed. The method comprises dividing automatically a roadway into a plurality of lane-level cells. The method also includes generating a graph network that represents the plurality of lane-level cells. The method also includes gathering information pertaining to one or more detected road agents. The method also includes projecting onto the graph network the gathered information pertaining to the one or more detected road agents to update a current status of the plurality of lane-level cells. The method also includes processing the graph network based on the updated current status of the plurality of lane-level cells to predict a future status of the plurality of lane-level cells, the predicted future status including at least occupancy, by a detected road agent, of the respective lane-level cells in the plurality of lane-level cells. The method also includes generating a driving recommendation based, at least in part, on the predicted future status of the plurality of lane-level cells.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Some conventional systems for analyzing traffic to avoid traffic incidents (e.g., collisions, high-deceleration events, etc.) take the approach of tracking and predicting the future behavior of road agents (vehicles, motorcycles, bicycles, scooters, pedestrians, etc.) in real time. It can be challenging to keep track of the various properties (location, speed, heading, etc.) of a plurality of road agents at the same time.

In various embodiments described herein, a driving recommendation system operates in accordance with a fundamentally different approach in which the system automatically conceptually divides a roadway or roadway system (e.g., an intersection, on-ramp, off-ramp, etc.) into a plurality of relatively granular lane-level cells or segments and tracks the status (e.g., occupancy by a road agent) of those roadway cells or segments over time instead of tracking the road agents directly. In some embodiments, the cells are from about 0.5 m to about 2 m in length along a longitudinal direction of the subdivided roadway. The cells are referred to as "lane-level" cells because each cell is the width of a single lane rather than spanning multiple lanes of a multi-lane roadway. The basic philosophy underlying the various embodiments described herein is that collisions occur with road agents that occupy space. If there is nothing occupying the space, there cannot be a collision or other traffic incident. Thus, the embodiments described herein track the occupancy, by road agents, of discrete segments of stationary space over time.

Once the roadway has been automatically divided into a plurality of lane-level cells, the system can generate a graph network that represents the plurality of lane-level cells. The graph network may also be referred to as a "graph model" or a "graph structure." In one embodiment, each node of the graph network corresponds to a unique cell in the plurality of lane-level cells (i.e., a one-to-one mapping), and the directed edges of the graph network represent what may be termed "emissions"—the exiting of a detected road agent from one cell to enter a different cell. The system uses this graph network as a framework for predicting whether a given cell will be occupied by a detected road agent at a future time. Drawing on a physics analogy, instead of approaching the problem as the tracking of a potentially large number of "particles" (road agents), the system instead takes an approach more akin to a diffusion model—tracking how the occupancy of the cells diffuses or propagates over time. This approach thus resembles a drift-diffusion model of space.

The various embodiments described herein gather information pertaining to one or more detected road agents. The gathered information can include a rich variety of different types, depending on the embodiment. For example, the gathered information can include raw vehicle sensor data such as image, radar, Light Detection and Ranging (LIDAR), and/or sonar data. The gathered information can also include, in some embodiments, derivative information (information derived from raw sensor data) such as position data (e.g., GPS coordinates), velocity data (e.g., speed and heading), object-detection data, image-segmentation data, visibility data (data pertaining to view obstructions and occlusions), and/or map data. The gathered information can also include, in some embodiments, time of day, day/date (day of the week, day of the year), weather data, and temperature data.

The system can project onto the graph network the gathered information pertaining to the one or more detected road agents to update the current status (e.g., occupancy) of the plurality of lane-level cells. This includes matching detected road agents with the cells to which their respective positions in space correspond and updating the graph network accordingly. The system can then process the graph network based on the updated current status of the plurality of lane-level cells to predict the future status of the respective cells in the plurality of lane-level cells. In various embodiments, the predicted future status includes at least whether the respective cells will be occupied by a detected road agent at a future time within a predetermined time horizon.

Based, at least in part, on the predicted future status of the plurality of lane-level cells, the system can generate a driving recommendation. In some embodiments, the driving recommendation includes a risk estimate pertaining to a future maneuver by an ego vehicle. For example, the system can output a risk estimate associated with making a left turn at an intersection the ego vehicle is approaching. In other embodiments, the risk estimate can pertain to the behavior of a particular detected road agent (e.g., an assessment that a particular detected road agent is a "risky driver"). In some embodiments, the driving recommendation can be communicated to an occupant of the ego vehicle. For example, driving recommendations can be displayed on a head-up display (HUD) or spoken (via computer-synthesized speech) to a driver of the ego vehicle.

Figure 1:
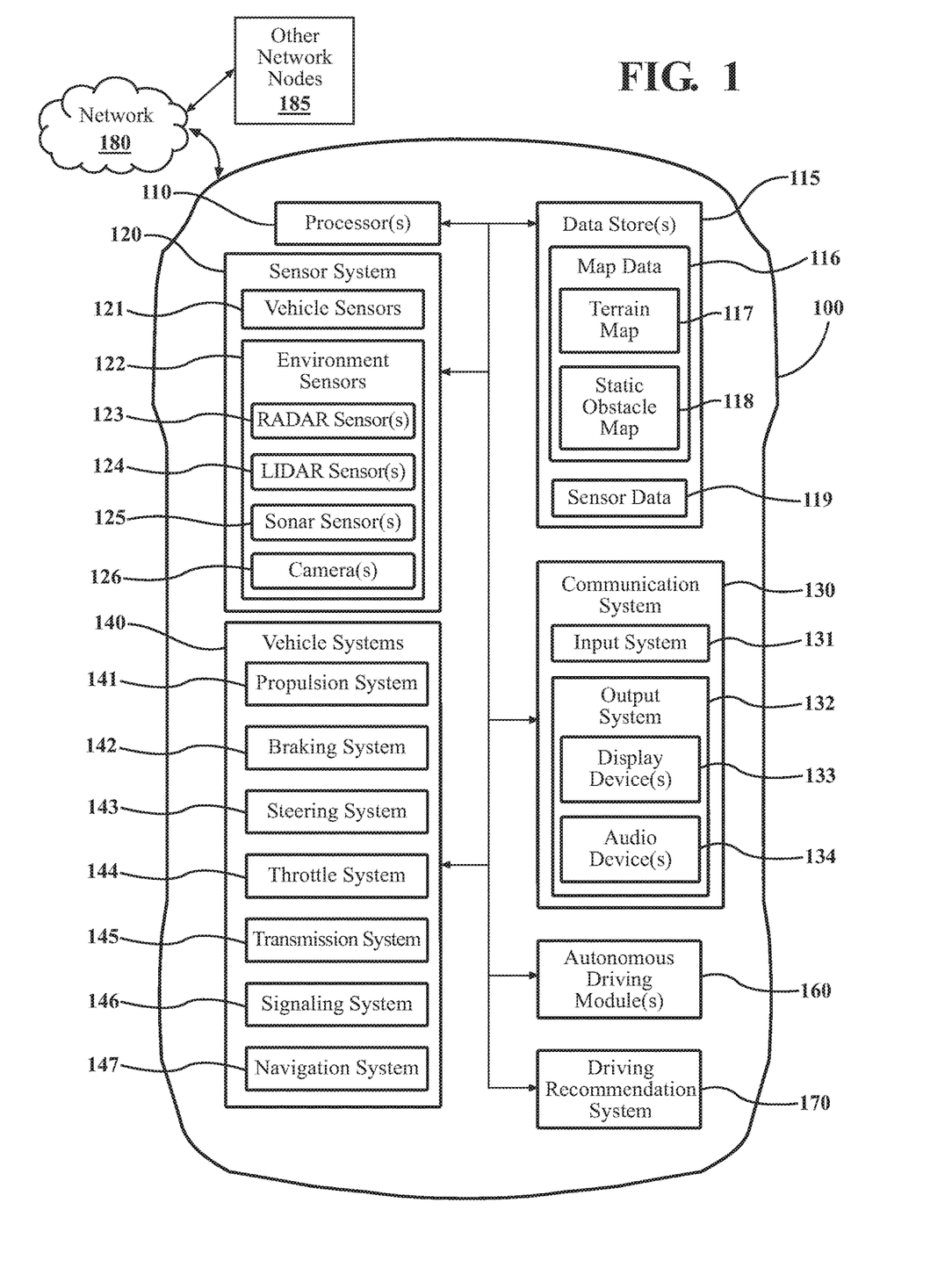
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. The vehicle 100 can include a driving recommendation system 170 or components and/or modules thereof. As used herein, a "vehicle" is any form of motorized transport. As mentioned above, a "road agent" is an occupier of a roadway, including, without limitation, vehicles, motorcycles, bicycles, scooters, and pedestrians. In one or more implementations, the vehicle 100 can be an automobile. In some implementations, the vehicle 100 may be any other form of motorized transport. In some embodiments, vehicle 100 is capable of operating in a semi-autonomous or fully autonomous mode. In some embodiments, vehicle 100 includes an adaptive cruise control (ACC) system and/or an advanced driver-assistance system (ADAS) (not shown in FIG. 1). The vehicle 100 can include the driving recommendation system 170 or capabilities to support or interact with the driving recommendation system 170 and thus benefits from the functionality discussed herein. While arrangements will be described herein with respect to automobiles, it will be understood that implementations are not limited to automobiles. Instead, implementations of the principles discussed herein can be applied to any kind of vehicle, as discussed above. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1 (e.g., an ACC system and/or an ADAS). In some arrangements, the vehicle 100 may be implemented without one or more of the elements shown in FIG. 1, including driving recommendation system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more other network nodes 185 via network 180. Such other network nodes 185 can include, for example, cloud servers, infrastructure systems (e.g., traffic signals, roadside units (RSUs), etc.), users' mobile devices, and other vehicles (e.g., via direct vehicle-to-vehicle (V2V) communication).

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system and a global navigation satellite system (GNSS) such as a global positioning system (GPS). Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126.

Herein, a vehicle 100 is sometimes referred to as an "ego vehicle 100" to indicate that the environment and other road agents in that environment external to the ego vehicle 100 are analyzed with respect to the point of view of that particular vehicle.

Figure 2:
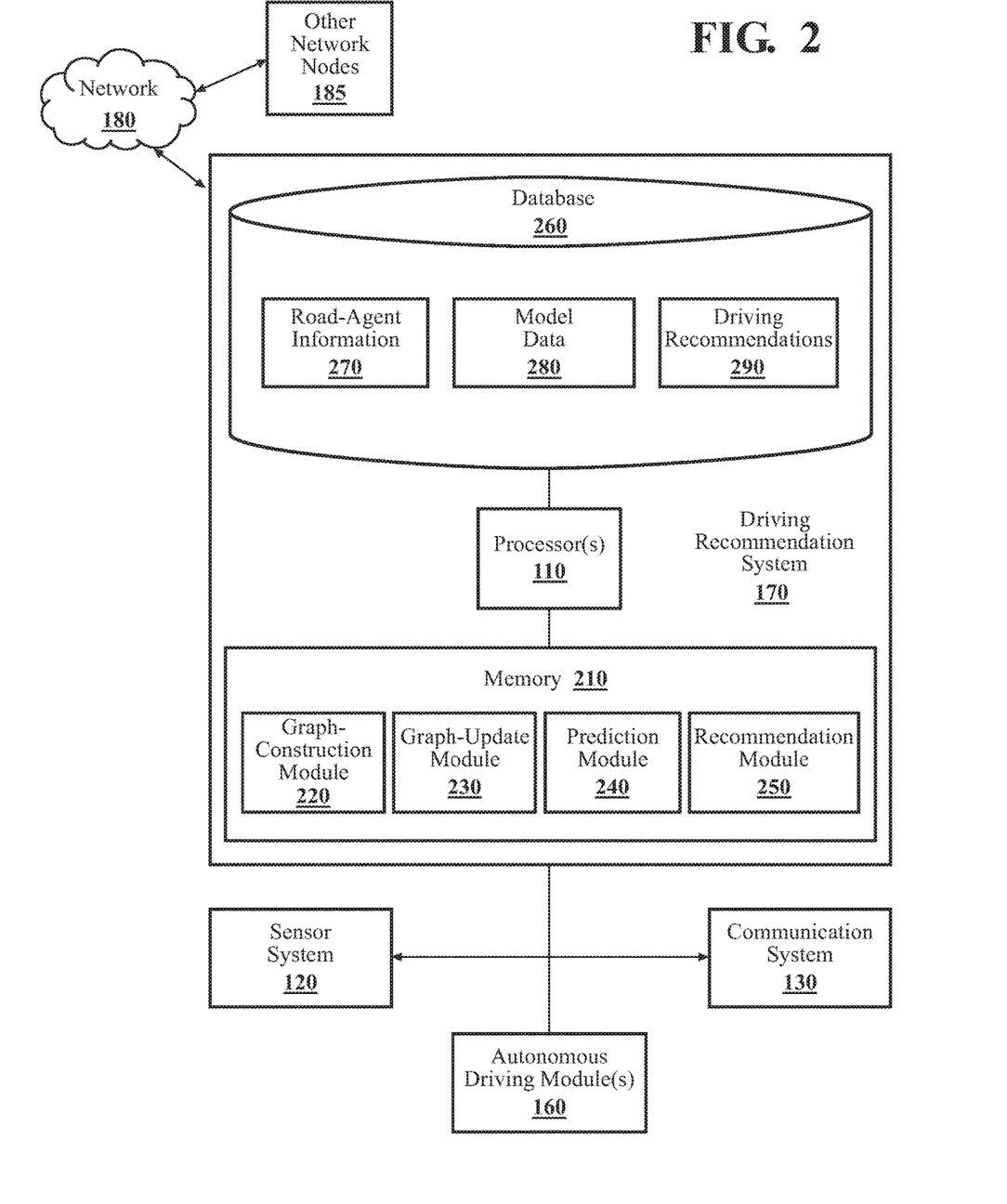
FIG. 2 illustrates one embodiment of a driving recommendation system.

Referring to FIG. 2, one embodiment of the driving recommendation system 170 of FIG. 1 is further illustrated. In this embodiment, driving recommendation system 170 is shown as including one or more processors 110 from the vehicle 100 of FIG. 1. In general, the one or more processors 110 may be a part of driving recommendation system 170, driving recommendation system 170 may include one or more separate processors from the one or more processors 110 of the vehicle 100, or driving recommendation system 170 may access the one or more processors 110 through a data bus or another communication path, depending on the embodiment.

In one embodiment, memory 210 stores a graph-construction module 220, a graph-update module 230, a prediction module 240, and a recommendation module 250. The memory 210 is a random-access memory (RAM), read-only memory (ROM), a hard-disk drive, a flash memory, or other suitable memory for storing the modules 220, 230, 240, and 250. The modules 220, 230, 240, and 250 are, for example, computer-readable instructions that when executed by the one or more processors 110, cause the one or more processors 110 to perform the various functions disclosed herein.

In some embodiments, driving recommendation system 170 includes, in memory 210, a training module (not shown in FIG. 2) including instructions that when executed by the one or more processors 110 cause the one or more processors 110 to train one or more neural networks that are part of driving recommendation system 170 (in particular, part of prediction module 240). In some embodiments, the training process can be supervised or semi-supervised. Some examples of neural networks used in particular embodiments are discussed below.

As shown in FIG. 2, driving recommendation system 170 can communicate with one or more other network nodes 185 via network 180. As discussed above, such other network nodes 185 can include, for example, cloud servers, infrastructure systems (e.g., traffic signals, RSUs, etc.), users' mobile devices, and other vehicles. In communicating with other vehicles via V2V communication links, driving recommendation system 170 can make use of technologies such as dedicated short-range communication (DSRC) or Bluetooth Low Energy (BLE). As shown in FIG. 2, driving recommendation system 170 can also communicate and interact with sensor system 120, communication system 130, and autonomous driving module(s) 160 (refer to FIG. 1).

In some embodiments, driving recommendation system 170 stores, in a database 260, road-agent information 270. As discussed above, road-agent information 270 can include a variety of raw sensor data from sensor system 120, information derived from raw sensor data, and other kinds of information (e.g., time of day, weather, temperature) that are used by driving recommendation system 170 in predicting the future status of the lane-level cells represented by a graph network to generate driving recommendations for a vehicle 100. Driving recommendation system 170 can also store, in database 260, model data 280—data that the modules of driving recommendation system 170 use in performing computations involving, for example, graph networks and neural networks. Driving recommendation system 170 can also store, in database 260, driving recommendations 290. How these various kinds of data are used in the context of driving recommendation system 170 is explained below.

Graph-construction module 220 generally includes instructions that when executed by the one or more processors 110 cause the one or more processors 110 to automatically divide a roadway or roadway system (e.g., an intersection, on-ramp, off-ramp, etc.) into a plurality of lane-level cells (herein sometimes referred to as simply "cells"). As discussed above, the cells are relatively granular (e.g., smaller in longitudinal length than the length of a motorized vehicle). In some embodiments, the cells are from about 0.5 m to about 2 m in length along a longitudinal direction of the subdivided roadway. The cells are referred to as "lane-level" cells because each cell is the width of a single lane rather than spanning multiple lanes of a multi-lane roadway. One example of this is illustrated in FIG. 3.

Figure 3:
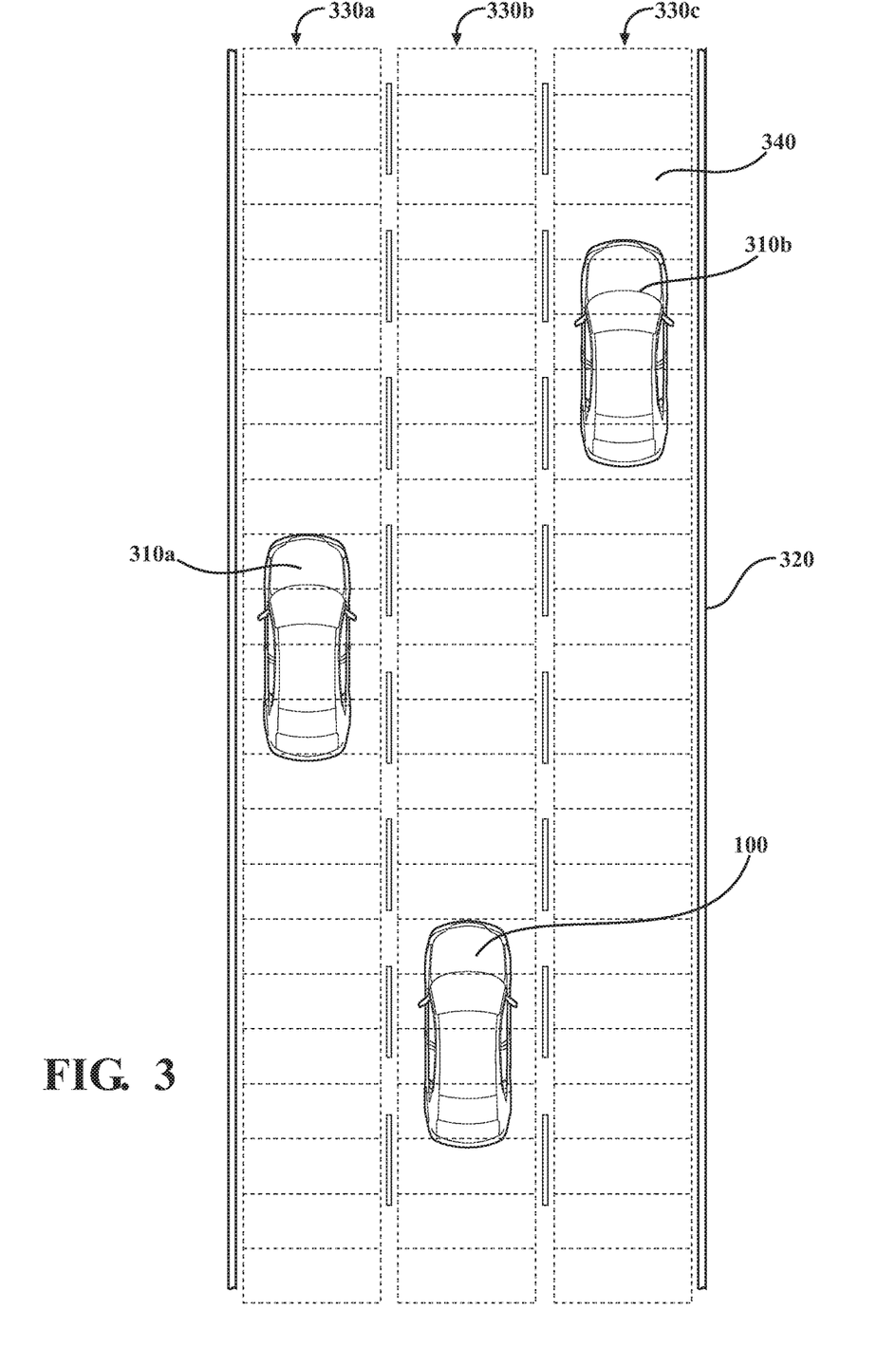
FIG. 3 illustrates the automatic division of a roadway into a plurality of lane-level cells, in accordance with an illustrative embodiment of the invention.

FIG. 3 illustrates the automatic division of a roadway into a plurality of lane-level cells, in accordance with an illustrative embodiment of the invention. In FIG. 3, an ego vehicle 100 and two road agents, road agent 310a and road agent 310b, are traveling in the same direction along a roadway 320. Roadway 320 includes three lanes, left lane 330a, center lane 330b, and right lane 330c. As shown in FIG. 3, graph-construction module 220 has automatically divided each of the three lanes of roadway 320 into a plurality of lane-level cells 340. As illustrated in FIG. 3, in this embodiment, the lane-level cells 340 are contiguous in the longitudinal direction within a given lane (330a, 330b, or 330c). Depending on the embodiment, the lane-level cells 340 in a given lane can also be contiguous in the lateral direction with those in one or more adjacent lanes, but, for the sake of clarity in FIG. 3, the lane-level cells 340 are shown as being slightly smaller in the lateral direction to avoid overlap with the dashed lane boundary lines separating the three lanes.

In some embodiments, the size of the cells can be dynamic over time. That is, graph-construction module 220 can define the cells to have a different longitudinal length depending on the circumstances. For example, in a high-speed highway environment, the cells can be somewhat coarser (e.g., a longitudinal length of 5 m per cell). In contrast, in an urban setting, a more granular cell size (e.g., a longitudinal length of 0.5 m to 1 m per cell) may be selected. In some embodiments, multiple graph-network-based models can be run simultaneously in parallel, each model employing a different cell length, and driving recommendation system 170 can choose the model with the best results or interpolate between models.

In dividing a roadway 320 into a plurality of lane-level cells 340, graph-construction module 220 may make use of available digital map data (refer, e.g., to map data 116 in FIG. 1). In some embodiments, this map data 116 is high-definition (HD) map data. In other embodiments, graph-construction module 220 uses lower-resolution map data such as OpenStreetMaps data. In still other embodiments, driving recommendation system 170 generates its own map data for the surrounding environment on the fly (in real time) based on sensor data processed by the perception subsystem of a vehicle 100.

Graph-construction module 220 also generally includes instructions that when executed by the one or more processors 110 cause the one or more processors 110 to generate a graph network that represents the plurality of lane-level cells 340. As those skilled in the art are aware, such a graph network may also be referred to as a "graph model" or a "graph structure." In one embodiment, each node of the graph network corresponds to a unique cell in the plurality of lane-level cells 340 (i.e., a one-to-one mapping from the cells to the nodes of the graph), and the directed edges of the graph network represent the "emissions" (propagation or diffusion of road agents to different cells over time) discussed above. In other embodiments, the roles of the nodes and directed edges discussed above are reversed. Also, in some embodiments, a given lane of traffic is modeled as being one-dimensional in the longitudinal direction. In those embodiments, the lateral direction within a lane is ignored because vehicles are presumed to remain within their respective lanes, unless they are changing lanes. Driving recommendation system 170 uses the graph network as a framework for predicting whether a given cell will be occupied by a detected road agent at a future time, as discussed further below. In one embodiment, each node of the graph has an associated position in space (i.e., the position, in space, of the corresponding cell) and an associated orientation.

Graph-construction module 220 also updates the topology of the graph network as needed. First, the topology of the graph network changes with time as an ego vehicle 100 travels along a roadway 320 due to the changing environment (roadway geometries, etc.). Second, graph-construction module 220 can track the nodes of the graph network corresponding to the lane-level cells 340 in accordance with a local coordinate system whose origin is shifted as frequently as is needed as the ego vehicle 100 travels along the roadway 320. For example, graph-construction module 220 might shift the origin of the local coordinate system to coincide with an intersection ego vehicle 100 is currently approaching. When the ego vehicle 100 reaches a subsequent intersection, graph-construction module 220 can again shift the origin of the local coordinate system, and so on.

Graph-update module 230 generally includes instructions that when executed by the one or more processors 110 cause the one or more processors 110 to gather information pertaining to one or more detected road agents. The road agents can, for example, be those detected by the perception and object-detection subsystem of a vehicle 100. As discussed above, the gathered information can include a rich variety of different types, depending on the embodiment. For example, the gathered information can include raw vehicle sensor data such as image, radar, LIDAR, and/or sonar data.

In some embodiments, sensor data from the sensor system 120 of a vehicle 100 can be supplemented by sensor data that driving recommendation system 170 receives from other nearby vehicles via V2V communication links. Such supplemental sensor data can be particularly helpful in overcoming occlusions from the perspective of an ego vehicle 100.

The gathered information, in some embodiments, can also include information derived from raw sensor data such as position data (e.g., GPS coordinates), velocity data (e.g., speed and heading), object-detection data, image-segmentation data, visibility data (data pertaining to view obstructions and occlusions), and/or map data. The gathered information, in some embodiments, can also include time of day, day/date (day of the week and/or day of the year), weather data, and temperature data. This kind of information provides additional context to the prediction algorithm, as discussed further below.

Graph-update module 230 also generally includes instructions that when executed by the one or more processors 110 cause the one or more processors 110 to project onto the graph network at least some of the gathered information pertaining to the one or more detected road agents to update the current status of the plurality of lane-level cells 340, as represented and stored in the graph network. This can include matching detected road agents with the cells to which their respective positions in space correspond and updating the graph network accordingly. The current status of a given cell can include, for example, whether the cell is occupied by a detected road agent and, if so, the measured velocity (speed and heading) of that detected road agent. In some embodiments, the emission probabilities (the probability that a road agent will exit a particular cell and enter a different cell within a predetermined time horizon) are stored in association with the directed edges of the graph network. Graph-update module 230 also updates those emission probabilities over time.

Prediction module 240 generally includes instructions that when executed by the one or more processors 110 cause the one or more processors 110 to process the data in the graph network based on the updated current status of the plurality of lane-level cells 340 to predict the future status of the plurality of lane-level cells 340 (e.g., over a predetermined time horizon). As with the current status of the cells, the predicted future status includes, in some embodiments, at least occupancy, by a detected road agent, of the respective lane-level cells in the plurality of lane-level cells 340. The predicted future status can also include predicted velocity information for detected road agents and predicted emission probabilities.

The predetermined time horizon for prediction can vary, depending on the embodiment. The rate at which driving recommendation system 170 updates its calculations iteratively can vary, depending on the embodiment. In one embodiment, driving recommendation system 170 operates at an update rate of 10 Hz. In another embodiment, the update rate is 5 Hz. In yet another embodiment, the update rate is 100 Hz. In general, the update rate substantially exceeds 1 Hz.

How prediction module 240 processes the data in the graph network to predict the future status of the plurality of lane-level cells 340 differs, depending on the particular embodiment. In one embodiment, prediction module 240 runs a discrete Gaussian kernel via a convolution over the nodes of the graph network to predict the future status of the cells (with noise). In another embodiment, prediction module 240 runs a custom kernel (asymmetrical, unlike a Gaussian kernel) via a convolution over the nodes of the graph network. A custom kernel can, in some situations, provide somewhat better results because it includes improved velocity estimates for detected road agents. In another embodiment, the emission probabilities are used to update the status of the cells represented by the graph network to predict the future status of the cells.

In other embodiments, prediction module 240 employs one or more neural networks in predicting the future status of the lane-level cells 340 represented by the graph neural network. For example, in one embodiment, prediction module 240 encodes the graph network into a vector or a tensor using a graph neural network (GNN) and a variational autoencoder (VAE) to produce an encoded graph network. Prediction module 240 then processes the encoded graph network data using a long short-term memory (LSTM) network to predict the future status of the cells in the plurality of lane-level cells 340. Prediction module 240 can then decode the encoded graph network data using the GNN to produce a decoded (or "re-projected") graph network.

As mentioned above, an important characteristic of the various embodiments of driving recommendation system 170 described herein is that, in predicting future road-agent behavior to generate driving recommendations, the system reasons about relatively small, stationary "cells" or "patches" of roadway rather than reasoning about road agents directly.

Recommendation module 250 generally includes instructions that when executed by the one or more processors 110 cause the one or more processors 110 to generate a driving recommendation based, at least in part, on the predicted future status of the plurality of lane-level cells 340. In one embodiment, the driving recommendation includes a risk estimate pertaining to a future maneuver by an ego vehicle 100 in which a driving recommendation system 170 is installed. For example, the system can output a risk estimate associated with making a left turn at an intersection the ego vehicle is approaching. If traffic conditions render making the planned or intended turn risky, recommendation module 250 can recommend turning left at the next intersection instead and making other needed route adjustments. In some embodiments, the risk-estimate computation constitutes a summation of the probabilities of occupancy over all of the relevant cells represented by the graph network. The relevant cells are those whose occupancy could impact the ego vehicle 100 (e.g., result in a traffic incident). Those embodiments can also employ a measure of traffic "density" defined as the product of the number of cells per meter and the probability that a road agent occupies a particular cell. In other embodiments, the risk estimate can pertain to the behavior of a particular detected road agent external to the ego vehicle 100 (e.g., an assessment that a particular detected road agent is controlled by a "risky driver").

In some embodiments, recommendation module 250 can communicate driving recommendations to an occupant of an ego vehicle 100 via communication system 130, which includes display device(s) 133 and audio device(s) 134. For example, driving recommendations can be displayed on a head-up display (HUD) or spoken (via computer-synthesized speech) to a driver of the ego vehicle over the vehicle's audio system. In other embodiments, the driving recommendations (e.g., risk estimates) can be input to the autonomous driving system of an ego vehicle 100 (see autonomous driving module(s) 160 in FIG. 1) while the ego vehicle 100 is operating in an autonomous driving mode. The driving recommendations can also be input to an ACC and/or an ADAS, in some embodiments, so that one or more aspects of the operation of a vehicle 100 (e.g., steering, acceleration, deceleration, or braking) can be controlled automatically, at least in part, in response to a driving recommendation.

Figure 4:
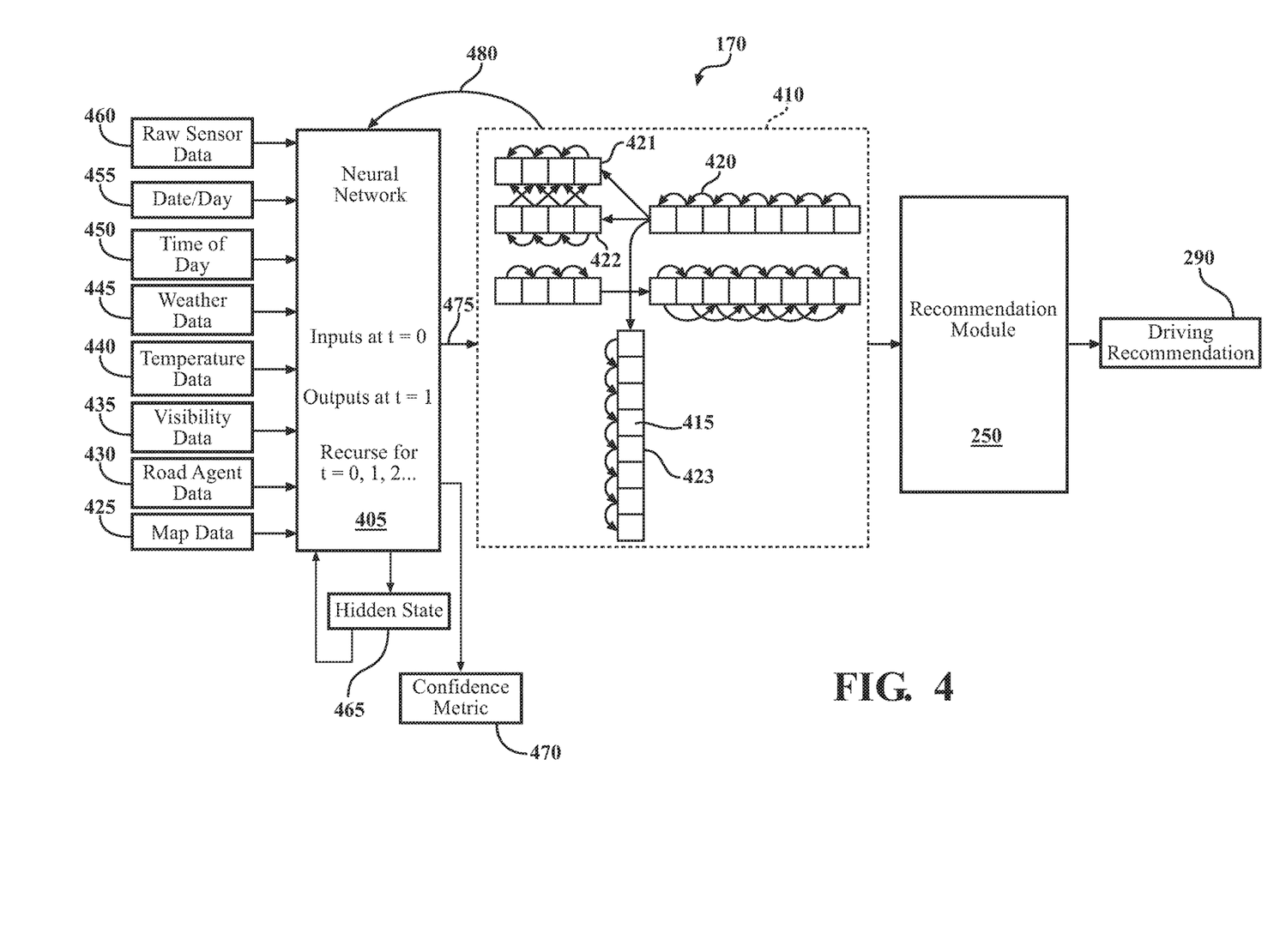
FIG. 4 is block diagram of a driving recommendation system, in accordance with an illustrative embodiment of the invention.

FIG. 4 is block diagram of a driving recommendation system 170, in accordance with an illustrative embodiment of the invention. In the embodiment of FIG. 4, graph network 410 represents a plurality of lane-level cells 340 into which a roadway system (not shown in FIG. 4) has been divided by graph-construction module 220. The graph network 410 shown in FIG. 4 corresponds to an intersection. The horizontal nodes 415, their directed edges 420 representing emissions, model the propagation of traffic in opposite directions (left and right in FIG. 4). For traffic moving toward the left in FIG. 4, graph network 410 models traffic proceeding straight (four-node group 422), traffic turning right (four-node group 421), and traffic turning left (eight-node group 423). Note that eight-node group 423 represents a one-way street in a downward direction in FIG. 4.

A graph encoder operation 480 encodes graph network 410, as discussed above, and the encoded graph-network data is input to neural network 405. Though labeled in FIG. 4 as "Neural Network 405," neural network 405 can, in some embodiments be a plurality of neural networks that operate together. Neural network 405 can also output decoded graph-network data via a graph decoder operation 475. As discussed above, in one embodiment, prediction module 240 performs the encoding and decoding of graph network 410 and the prediction of the future status of the cells represented by the nodes 415 using a GNN and a VAE, the neural network 405 also including a LSTM component for time-series prediction that accounts for a hidden state 465 in the model. In a different embodiment, the hidden state 465 can instead be a latent state of the VAE. In some embodiments, neural network 405 also outputs a confidence metric 470, an estimate of the confidence level associated with the predictions of future status of the lane-level cells represented by graph network 410. In some embodiments, the confidence metric 470 is input to recommendation module 250.

As shown in FIG. 4, neural network 405 also accepts as inputs, in this embodiment, raw sensor data 460 (e.g., from sensor system 120), date/day 455 (day of the week and/or day of the year), time of day 450, weather data 445, temperature data 440, visibility data 435 (data pertaining to obstructions and occlusions caused by, e.g., trees or other objects), road-agent data 430 (e.g., position data, velocity data, object-detection or image-segmentation data), and map data 425. In some embodiments, one or more of these inputs might be omitted. Some types of data that are considered optional, in some embodiments, are weather data 445, temperature data 440, time of day 450, date/day 455, and map data 425. Including such information as inputs can be advantageous, however. For example, if prediction module 240 has been trained that a road agent is more likely to proceed through a yellow light during rush hour, prediction module 240 can make more accurate predictions and, consequently, driving recommendations based on the knowledge that it is currently rush hour (time of day). Knowledge of weather conditions, day of the week, day of the year, and temperature can provide similar advantages under various circumstances.

As indicated in FIG. 4, recommendation module 250 generates driving recommendations 290 based on the analysis performed by prediction module 240 and supported by graph-construction module 220 and graph-update module 230, as described above. As also indicated in FIG. 4, relatively speaking, neural network 405 processes inputs at discrete time step t=0, outputs predictions at t=1 (for the next discrete time step), and the system recurses for discrete time steps t=0, 1, 2, . . . .

In some embodiments, the visibility data 435 and the road-agent data 430 can be input in the form of a graph network similar to graph network 410. These inputs can also be used as supervisory inputs to neural network 405 during a training phase of driving recommendation system 170. As discussed above, in some embodiments, driving recommendation system 170 includes a training module that controls the training of the neural networks that are part of driving recommendation system 170.

Figure 5:
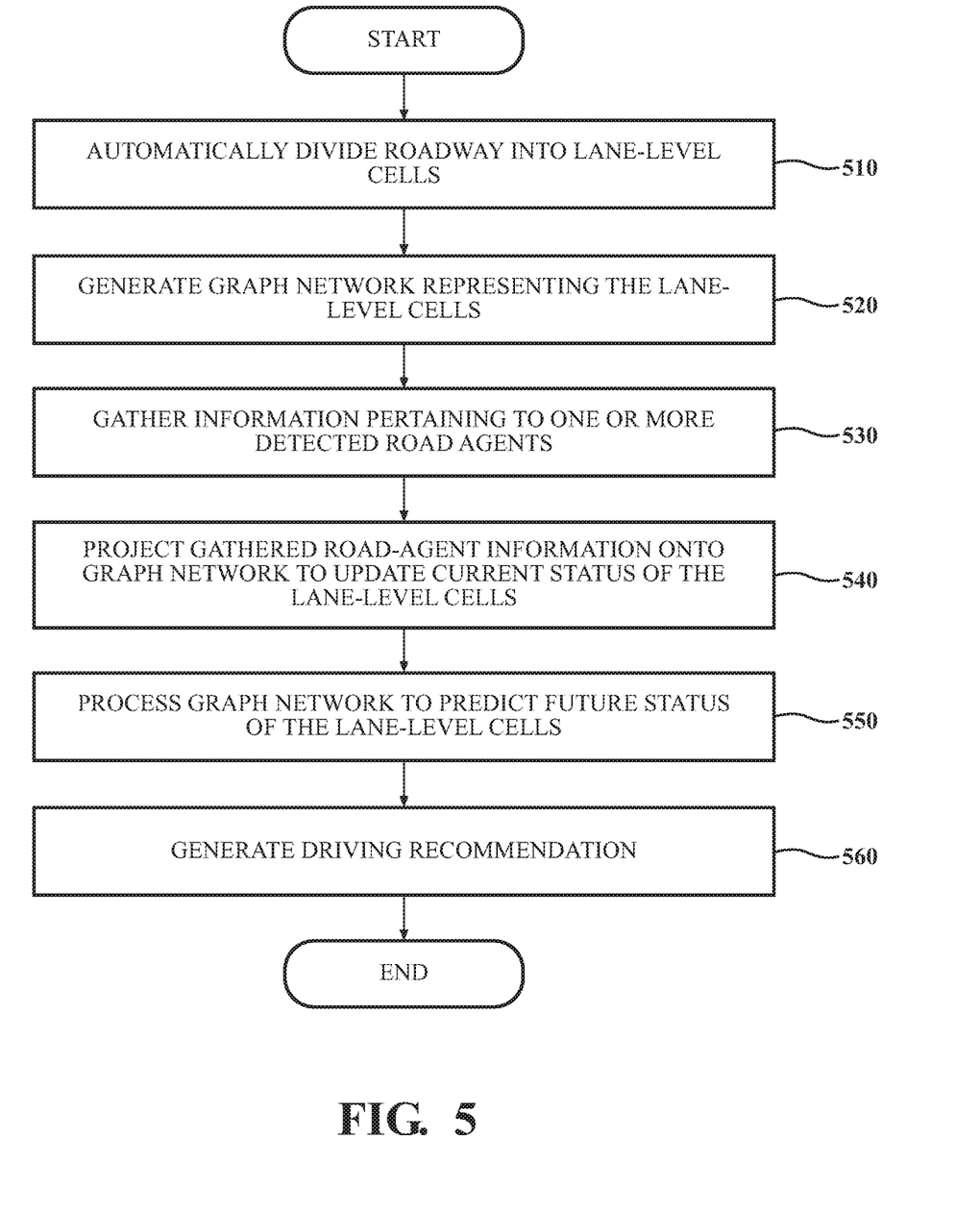
FIG. 5 is a flowchart of a method of generating driving recommendations, in accordance with an illustrative embodiment of the invention.

FIG. 5 is a flowchart of a method 500 of predicting a trajectory of a road agent, in accordance with an illustrative embodiment of the invention. Method 500 will be discussed from the perspective of driving recommendation system 170 in FIG. 2. While method 500 is discussed in combination with driving recommendation system 170, it should be appreciated that method 500 is not limited to being implemented within driving recommendation system 170, but driving recommendation system 170 is instead one example of a system that may implement method 500. Note that some embodiments include additional actions that are not shown in FIG. 5. Those additional actions are discussed below after the discussion of FIG. 5.

At block 510, graph-construction module 220 automatically divides a roadway 320 into a plurality of lane-level cells 340. As discussed above, the cells can be relatively granular. For example, in some embodiments, the cells range from about 0.5 m to about 2 m in length along a longitudinal direction of the subdivided roadway 320. As also explained above, in dividing a roadway 320 into a plurality of lane-level cells 340, graph-construction module 220 may make use of available digital map data. In some embodiments, this map data is HD map data. In other embodiments, graph-construction module 220 uses lower-resolution map data such as OpenStreetMaps data. In still other embodiments, driving recommendation system 170 generates its own map data for the surrounding environment on the fly (in real time) based on sensor data processed by the perception subsystem of a vehicle 100.

At block 520, graph-construction module 220 generates a graph network 410 that represents the plurality of lane-level cells 340. As discussed above, in one embodiment, each node 415 of the graph network 410 corresponds to a unique cell in the plurality of lane-level cells 340, and the directed edges 420 of the graph network 410 represent "emissions" (propagation or diffusion of road agents to different cells over time). Driving recommendation system 170 uses the graph network 410 as a framework for predicting whether a given cell will be occupied by a detected road agent at a future time within a predetermined time horizon. In one embodiment, each node 415 of the graph network 410 has an associated position in space (i.e., the position, in space, of the corresponding cell) and an associated orientation.

At block 530, graph-update module 230 gathers information pertaining to one or more detected road agents. As discussed above, the road agents can, for example, be those detected by the perception and object-detection subsystem of a vehicle 100. As also discussed above, the gathered information can include a rich variety of different types, depending on the embodiment. For example, the gathered information can include raw vehicle sensor data such as image, radar, LIDAR, and/or sonar data. In some embodiments, sensor data from the sensor system 120 of a vehicle 100 can be supplemented by sensor data that driving recommendation system 170 receives from other nearby vehicles via V2V communication links. Such supplemental sensor data can be particularly helpful in overcoming occlusions from the perspective of an ego vehicle 100.

The gathered information, in some embodiments, can also include information derived from raw sensor data such as position data (e.g., GPS coordinates), velocity data (e.g., speed and heading), object-detection data, image-segmentation data, visibility data (data pertaining to view obstructions and occlusions), and/or map data. The gathered information, in some embodiments, can also include time of day, day/date (day of the week and/or day of the year), weather data, and temperature data.

At block 540, graph-update module 230 projects onto the graph network 410 at least some of the gathered information pertaining to the one or more detected road agents to update the current status of the plurality of lane-level cells 340, as represented and stored in the graph network 410. This can include matching detected road agents with the cells to which their respective positions in space correspond and updating the graph network 410 accordingly. The current status of a given cell can include, for example, whether the cell is occupied by a detected road agent and, if so, the measured velocity (speed and heading) of that detected road agent. In some embodiments, the emission probabilities (the probability that a road agent will exit a particular cell and enter a different cell within a predetermined time horizon) are stored in association with the directed edges 420 of the graph network 410. Graph-update module 230 also updates those emission probabilities over time.

At block 550, prediction module 240 processes the graph network 410 based on the updated current status of the plurality of lane-level cells 340 to predict the future status of the plurality of lane-level cells 340. As with the current status of the cells, the predicted future status includes, in some embodiments, at least occupancy, by a detected road agent, of the respective lane-level cells in the plurality of lane-level cells 340. The predicted future status can also include predicted velocity information for detected road agents and predicted emission probabilities.

As discussed above, how prediction module 240 processes the data in the graph network 410 to predict the future status of the plurality of lane-level cells 340 differs, depending on the particular embodiment. In one embodiment, prediction module 240 runs a discrete Gaussian kernel or a custom asymmetrical kernel via a convolution over the nodes 415 of the graph network 410 to predict the future status of the cells (with noise). In another embodiment, the emission probabilities are used to update the status of the cells represented by the graph network 410 to predict the future status of the cells. In yet other embodiments, prediction module 240 employs one or more neural networks to perform prediction. For example, in one embodiment, prediction module 240 encodes the graph network into a vector or a tensor using a GNN and a VAE to produce an encoded graph network. Prediction module 240 then processes the encoded graph network data using a long short-term memory (LSTM) network to predict the future status of the cells in the plurality of lane-level cells 340. Prediction module 240 can then decode the encoded graph network data using the GNN to produce a decoded (or "re-projected") graph network.

At block 560, recommendation module 250 generates a driving recommendation 290 based, at least in part, on the predicted future status of the plurality of lane-level cells 340.

Depending on the embodiment, method 500 can include additional actions and variations not shown in FIG. 5. In one embodiment, the driving recommendation 290 includes a risk estimate pertaining to a future maneuver by an ego vehicle 100 in which a driving recommendation system 170 is installed. For example, recommendation module 250 can output a risk estimate associated with making a left turn at an intersection the ego vehicle 100 is approaching. If traffic conditions render making the planned or intended turn risky, recommendation module 250 can recommend turning left at the next intersection instead and making other needed route adjustments. In some embodiments, the risk-estimate computation constitutes a summation of the probabilities of occupancy over all of the relevant cells represented by the graph network 410. In other embodiments, the risk estimate can pertain to the behavior of a particular detected road agent external to the ego vehicle 100 (e.g., an assessment that a particular detected road agent is controlled by a "risky driver").

In some embodiments, recommendation module 250 can communicate driving recommendations, including risk estimates, to an occupant of an ego vehicle 100 via communication system 130, which includes display device(s) 133 and audio device(s) 134. For example, driving recommendations can be displayed on a HUD or spoken (via computer-synthesized speech) to a driver of the ego vehicle 100 over the vehicle's audio system. In other embodiments, the driving recommendations (e.g., risk estimates) can be input to the autonomous driving system of an ego vehicle 100 (see autonomous driving module(s) 160 in FIG. 1) while the ego vehicle 100 is operating in an autonomous driving mode. The driving recommendations can also be input to an ACC and/or an ADAS, in some embodiments, to support at least partial automatic control (e.g., an intervention) of steering, acceleration, deceleration, and/or braking.

In some embodiments, driving recommendation system 170 can bootstrap itself by relying on information (e.g., a traffic report) from a conventional macroscopic-level traffic monitoring system as a point of departure and then iterating using the techniques described herein to refine the tracking of the status of the more granular lane-level cells 340.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for generating driving recommendations, the system comprising:
   one or more processors; and
   a memory communicably coupled to the one or more processors and storing:
      a graph-construction module including instructions that when executed by the one or more processors cause the one or more processors to:
         divide automatically a roadway into a plurality of lane-level cells; and
         generate a graph network that represents the plurality of lane-level cells;
      a graph-update module including instructions that when executed by the one or more processors cause the one or more processors to:
         gather information pertaining to one or more detected road agents; and
         project onto the graph network the gathered information pertaining to the one or more detected road agents to update a current status of the plurality of lane-level cells;
      a prediction module including instructions that when executed by the one or more processors cause the one or more processors to process the graph network based on the updated current status of the plurality of lane-level cells to predict a future status of the plurality of lane-level cells, the predicted future status including at least occupancy, by a detected road agent, of the respective lane-level cells in the plurality of lane-level cells; and
      a recommendation module including instructions that when executed by the one or more processors cause the one or more processors to generate a driving recommendation based, at least in part, on the predicted future status of the plurality of lane-level cells.

2. The system of claim 1, wherein each lane-level cell in the plurality of lane-level cells is less than 2 meters in length in a longitudinal direction of the roadway.

3. The system of claim 1, wherein the gathered information pertaining to the one or more detected road agents includes one or more of position data, velocity data, raw sensor data, object-detection data, image-segmentation data, data pertaining to view obstructions and occlusions, map data, time of day, day of week, weather data, and temperature data.

4. The system of claim 1, wherein the graph network includes a plurality of nodes and the instructions in the prediction model to process the graph network based on the updated current status of the plurality of lane-level cells to predict a future status of the plurality of lane-level cells include instructions to run one of a discrete Gaussian kernel and a custom asymmetrical kernel via convolution over the plurality of nodes.

5. The system of claim 1, wherein the instructions in the prediction model to process the graph network based on the updated current status of the plurality of lane-level cells to predict a future status of the plurality of lane-level cells include instructions to:
encode the graph network using a graph neural network (GNN) and a variational autoencoder (VAE) to produce an encoded graph network;
process the encoded graph network using a long short-term memory (LSTM) network to predict the future status of the plurality of lane-level cells; and
decode the encoded graph network using the GNN to produce a decoded graph network.

6. The system of claim 1, wherein the system is deployed in an ego vehicle and the driving recommendation includes a risk estimate pertaining to a future maneuver by the ego vehicle.

7. The system of claim 6, wherein the ego vehicle is an autonomous vehicle.

8. The system of claim 6, wherein the recommendation module includes further instructions to communicate the risk estimate to an occupant of the ego vehicle.

9. The system of claim 1, wherein the system is deployed in an ego vehicle, the driving recommendation includes a risk estimate pertaining to behavior of a particular one of the one or more detected road agents, and the recommendation module includes further instructions to communicate the risk estimate to an occupant of the ego vehicle.

10. The system of claim 1, wherein the gathered information pertaining to the one or more detected road agents projected onto the graph network includes occupancy, velocity, and emission probability, wherein the emission probability is a probability that a given detected road agent will exit a current lane-level cell in the plurality of lane-level cells to enter a different lane-level cell in the plurality of lane-level cells within a predetermined time horizon.

11. A non-transitory computer-readable medium for generating driving recommendations and storing instructions that when executed by one or more processors cause the one or more processors to:
divide automatically a roadway into a plurality of lane-level cells;
generate a graph network that represents the plurality of lane-level cells;
gather information pertaining to one or more detected road agents;
project onto the graph network the gathered information pertaining to the one or more detected road agents to update a current status of the plurality of lane-level cells;
process the graph network based on the updated current status of the plurality of lane-level cells to predict a future status of the plurality of lane-level cells, the predicted future status including at least occupancy, by a detected road agent, of the respective lane-level cells in the plurality of lane-level cells; and
generate a driving recommendation based, at least in part, on the predicted future status of the plurality of lane-level cells.

12. The non-transitory computer-readable medium of claim 11, wherein the driving recommendation includes a risk estimate pertaining to a future maneuver by an ego vehicle.

13. A method of generating driving recommendations, the method comprising:
dividing automatically a roadway into a plurality of lane-level cells;
generating a graph network that represents the plurality of lane-level cells;
gathering information pertaining to one or more detected road agents;
projecting onto the graph network the gathered information pertaining to the one or more detected road agents to update a current status of the plurality of lane-level cells;
processing the graph network based on the updated current status of the plurality of lane-level cells to predict a future status of the plurality of lane-level cells, the predicted future status including at least occupancy, by a detected road agent, of the respective lane-level cells in the plurality of lane-level cells; and
generating a driving recommendation based, at least in part, on the predicted future status of the plurality of lane-level cells.

14. The method of claim 13, wherein each lane-level cell in the plurality of lane-level cells is less than 2 meters in length in a longitudinal direction of the roadway.

15. The method of claim 13, wherein the gathered information pertaining to the one or more detected road agents includes one or more of position data, velocity data, raw sensor data, object-detection data, image-segmentation data, data pertaining to view obstructions and occlusions, map data, time of day, day of week, weather data, and temperature data.

16. The method of claim 13, wherein the graph network includes a plurality of nodes and processing the graph network based on the updated current status of the plurality of lane-level cells to predict a future status of the plurality of lane-level cells includes running one of a discrete Gaussian kernel and a custom asymmetrical kernel via convolution over the plurality of nodes.

17. The method of claim 13, wherein processing the graph network based on the updated current status of the plurality of lane-level cells to predict a future status of the plurality of lane-level cells includes:
encoding the graph network using a graph neural network (GNN) and a variational autoencoder (VAE) to produce an encoded graph network;
processing the encoded graph network using a long short-term memory (LSTM) network to predict the future status of the plurality of lane-level cells; and
decoding the encoded graph network using the GNN to produce a decoded graph network.

18. The method of claim 13, wherein the driving recommendation includes a risk estimate pertaining to a future maneuver by an ego vehicle.

19. The method of claim 18, further comprising communicating the risk estimate to an occupant of the ego vehicle.

20. The method of claim 13, wherein the gathered information pertaining to the one or more detected road agents projected onto the graph network includes occupancy, velocity, and emission probability, wherein the emission probability is a probability that a given detected road agent will exit a current lane-level cell in the plurality of lane-level cells to enter a different lane-level cell in the plurality of lane-level cells within a predetermined time horizon.

* * * * *